United States Patent
Schneider et al.

(10) Patent No.: US 8,201,739 B2
(45) Date of Patent: Jun. 19, 2012

(54) BIOMETRIC SENSOR WITH DELAY LAYER

(75) Inventors: John K. Schneider, Snyder, NY (US); Jack C. Kitchens, Tonawanda, NY (US)

(73) Assignee: Ultra-Scan Corporation, Amherst, NY (US)

( * ) Notice: Subject to any disclaimer, the term of this patent is extended or adjusted under 35 U.S.C. 154(b) by 0 days.

(21) Appl. No.: 13/043,388

(22) Filed: Mar. 8, 2011

(65) Prior Publication Data

US 2011/0215150 A1    Sep. 8, 2011

Related U.S. Application Data

(60) Provisional application No. 61/311,667, filed on Mar. 8, 2010.

(51) Int. Cl.
*G06K 7/00* (2006.01)
(52) U.S. Cl. ........................................ 235/439
(58) Field of Classification Search .................. 235/435, 235/439, 492; 382/115, 124
See application file for complete search history.

(56) References Cited

U.S. PATENT DOCUMENTS

| | | | |
|---|---|---|---|
| 5,065,763 A | 11/1991 | Green et al. | |
| 5,456,256 A | 10/1995 | Schneider et al. | |
| 7,180,643 B2 * | 2/2007 | Carver et al. | 359/2 |
| 7,400,750 B2 | 7/2008 | Nam | |
| 2002/0145050 A1 * | 10/2002 | Jayaratne | 235/492 |
| 2004/0111028 A1 | 6/2004 | Abe et al. | |
| 2005/0110103 A1 | 5/2005 | Setlak | |
| 2007/0258628 A1 | 11/2007 | Schneider et al. | |
| 2008/0159598 A1 | 7/2008 | Iasso | |
| 2010/0052478 A1 | 3/2010 | Schneider et al. | |

OTHER PUBLICATIONS

International Search Report and Written Opinion from PCT/US2011/027605, May 5, 2011, Ultra-Scan Corporation.

* cited by examiner

*Primary Examiner* — Seung Lee
(74) *Attorney, Agent, or Firm* — Hodgson Russ LLP

(57) ABSTRACT

A biometric scanner is described and claimed. The scanner has a platen, an ultrasonic plane wave generator, an ultrasonic detector, and a delay layer residing between the generator and the detector.

25 Claims, 3 Drawing Sheets

BIOMETRIC SENSOR WITH DELAY LAYER

CROSS-REFERENCE TO RELATED APPLICATION

This application claims the benefit of priority to U.S. provisional patent application Ser. No. 61/311,667, filed on Mar. 8, 2010.

FIELD OF THE INVENTION

The present invention relates to an ultrasonic reflex (i.e. reflected) imaging system that is constructed such that it employs a plane wave ultrasound pulse generator, and uses a separate detector array, and there is a layer of material which delays movement of the energy. The delay layer resides in the path of the ultrasound energy.

BACKGROUND OF THE INVENTION

Since the 1800's fingerprint information has been collected from human fingers and hands by means of ink and paper. For the purposes of this document, the term fingerprint is used to mean the skin surface friction ridge detail of a single fingerprint, partial fingerprint or any portion of the skin surface friction ridge of up to and including the entire hand. In recent years various electronic fingerprint scanning systems have been developed utilizing optical, capacitance, direct pressure, thermal and acoustic methods. Methods based upon acoustics or ultrasound have proven to be the most accurate, as they are virtually immune to the effects of grease, dirt, paint, ink and other image contaminants.

The ultrasound method employs a piezoelectric transducer that sends a longitudinal wave or pulse through an acoustic transmitting media. The pulse then partially reflects back at each media interface. The pulse reflected back to the sensing element may be used to measure the distance traveled by the pulse going and returning for each reflecting material interface. A time interval is monitored, so that valid signals can be identified using a process called range gating (biasing). Valid signals may be those which carry information that is desired. If the range of time during which a valid signal is expected to arrive at the sensing element is known, the control circuitry can be made to accept information produced by the sensing element during that time. Signals from each of the sensing elements are then processed, for example by converting each signal to a digital value representing the signal strength. Graphically displaying this information creates a three-dimensional contour map of the object (human finger or skin surface) that is in contact with the platen surface, with the depth of any gap structure (fingerprint valleys) detail being displayed as a gray-scale bitmap image.

Often, the device which generates the ultrasound energy is also used to detect the reflected ultrasound energy. It has been found that using the same device to generate and detect creates difficulties which often reduce the clarity of the image that can be obtained.

SUMMARY OF THE INVENTION

The invention may be embodied as a biometric scanner having a platen, an ultrasonic plane wave generator, an ultrasonic detector, and a delay layer residing between the generator and the detector. The scanner may have an ultrasonic detector, which includes an array of individually addressable elements. The array of individually addressable elements may be a semiconductor array or a TFT array. The array of individually addressable elements may be fixed to an insulating substrate. The addressable elements may be an array of semiconductors, such as CMOS transistors or charge coupled devices.

The detector may include a hydrophone array. The hydrophone array may have a first electrode and a plurality of second electrodes, wherein the second electrodes are positioned between the first electrode and the array of individually addressable elements. A piezoelectric film may reside between the first electrode and the plurality of second electrodes. The piezoelectric film may be a polymeric or ceramic film exhibiting ferroelectric or piezoelectric properties. For example, the piezoelectric film may be PVDF, PVDF-TrFE copolymer, or PVDF-TFE copolymer.

The detector may include an insulating substrate. The substrate may be a plastic or a ceramic. If ceramic, the substrate may be glass.

Control electronics may be connected to the generator and to the detector. The control electronics may be able to manage timing of a generated energy pulse, and sensing of reflected energy resulting from the generated pulse, the reflected energy being reflected by an object residing on the platen.

The platen and/or the delay layer may be a plastic material such as polystyrene resin. For example, General Purpose Polystyrene ("GPPS"), Cross Linked Polystyrene ("XLPS"), or polymethylmethacrilate ("PMMA") resin may be used.

BRIEF DESCRIPTION OF THE DRAWINGS

For a fuller understanding of the nature and objects of the invention, reference should be made to the accompanying drawings and the subsequent description. Briefly, the drawings are:

FIG. 3A shows a TFT array that employs a diode peak detector at each pixel. FIG. 3B shows a simpler system that performs peak detection on a separate circuit from the TFT.

FURTHER DESCRIPTION OF THE INVENTION

Figure 1:
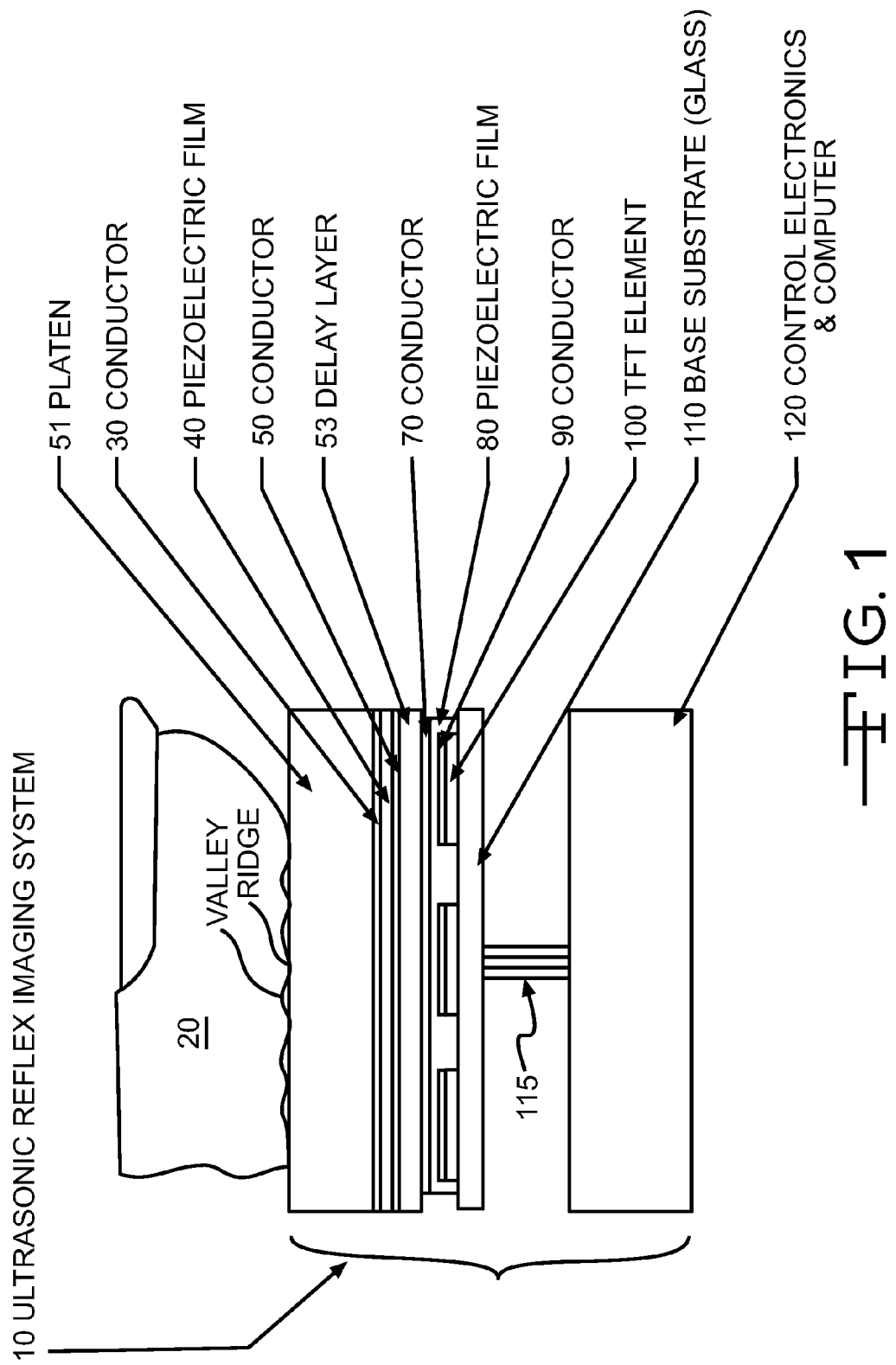
FIG. 1 is a schematic diagram of an embodiment of the present invention.

FIG. 1 depicts a scanner 10 according to the invention. The scanner 10 may be used to obtain biometric information, such as a fingerprint from a finger 20. Such information may be used to authenticate the identity of an individual. The device depicted in FIG. 1 utilizes an array of detecting elements in a two-dimensional layout, which is sometimes referred to as an "area array". The scanner 10 may be used to capture a fingerprint image representing the friction ridge surface of a finger 20. The scanner 10 may be implemented in a manner that gives it a competitive advantage over other currently available electronic fingerprinting systems. For example, the invention may be deployed in a form that is capable of imaging a small (¼"×¼") area, but that design may be scalable to afford imaging of a large area, which could be several meters in length and several meters in width. An imaging area that is 3.0"×3.2" might be preferred so that four fingers can be imaged simultaneously. Also, a device made according to the invention may be capable of exhibiting a high degree of reliability.

Several means are available for achieving imaging with ultrasound devices and techniques. In one embodiment, a piezoelectric array of receiving devices and a solid state thin film transistor (TFT) array or silicon chip may be used to detect ultrasonic energy that has been reflected by a biological object. Such a detector may afford an ability to image a large number of pixel areas simultaneously. The detector may be constructed keeping in mind that with ultrasound, the indices of refraction are based upon ratios of the speed of the longitudinal wave in the various media. And thus, consideration should be give to the diffraction limit based on the wavelength of the ultrasonic energy. For example, at 24 MHz the ultrasonic energy has a wavelength that is approximately 0.002 inches, thus limiting the resolution to approximately 500 dpi.

Acoustic impedance is the property of a material causing resistance to the propagation of a longitudinal wave. Acoustic impedance, Z, is defined as $Z=r \cdot c$, where r is the material density, and c is the longitudinal propagation velocity of the wave in the material. Propagation of the longitudinal wave is dependent partly upon the particle mass (which determines the density of the material) and partly upon the elastic forces binding the particles together (which determine the propagation speed of the longitudinal wave). A fraction of the longitudinal wave pulse is reflected whenever there is a change in acoustic impedance. The larger the change in acoustic impedance, the larger the fraction reflected. The fraction of the longitudinal wave that is reflected as a result of differences in acoustic impedance between two materials can be calculated by the equation, $R=((Z_1-Z_2)/(Z_1+Z_2))^2$, where R is the fraction of the wave that is reflected, $Z_1$ is the acoustic impedance of the first material and $Z_2$ is the acoustic impedance of the second material. In the case of a finger 20 residing on a platen 51, if the platen 51 has an impedance that is similar to that of the finger 20, the longitudinal wave will pass into those parts of the finger 20 that are in contact with the platen 51, such as the ridges of a fingerprint. If the platen's 51 impedance is not similar to air, the longitudinal wave will be reflected at the air-platen interface, such as at those locations where the valleys of a fingerprint are located.

In the proposed inventive system, the platen 51 and finger 20 are ultrasonically "illuminated" and the echo can be detected as a reflected (reflex) image and converted directly to an image of the finger 20 by means of an array of detecting elements. So called "acoustical optics" devices (e.g., lenses, prisms, mirrors or reflectors) may serve to transfer the ultrasonic image information from the platen or contact surface to the detector.

Figure 2:
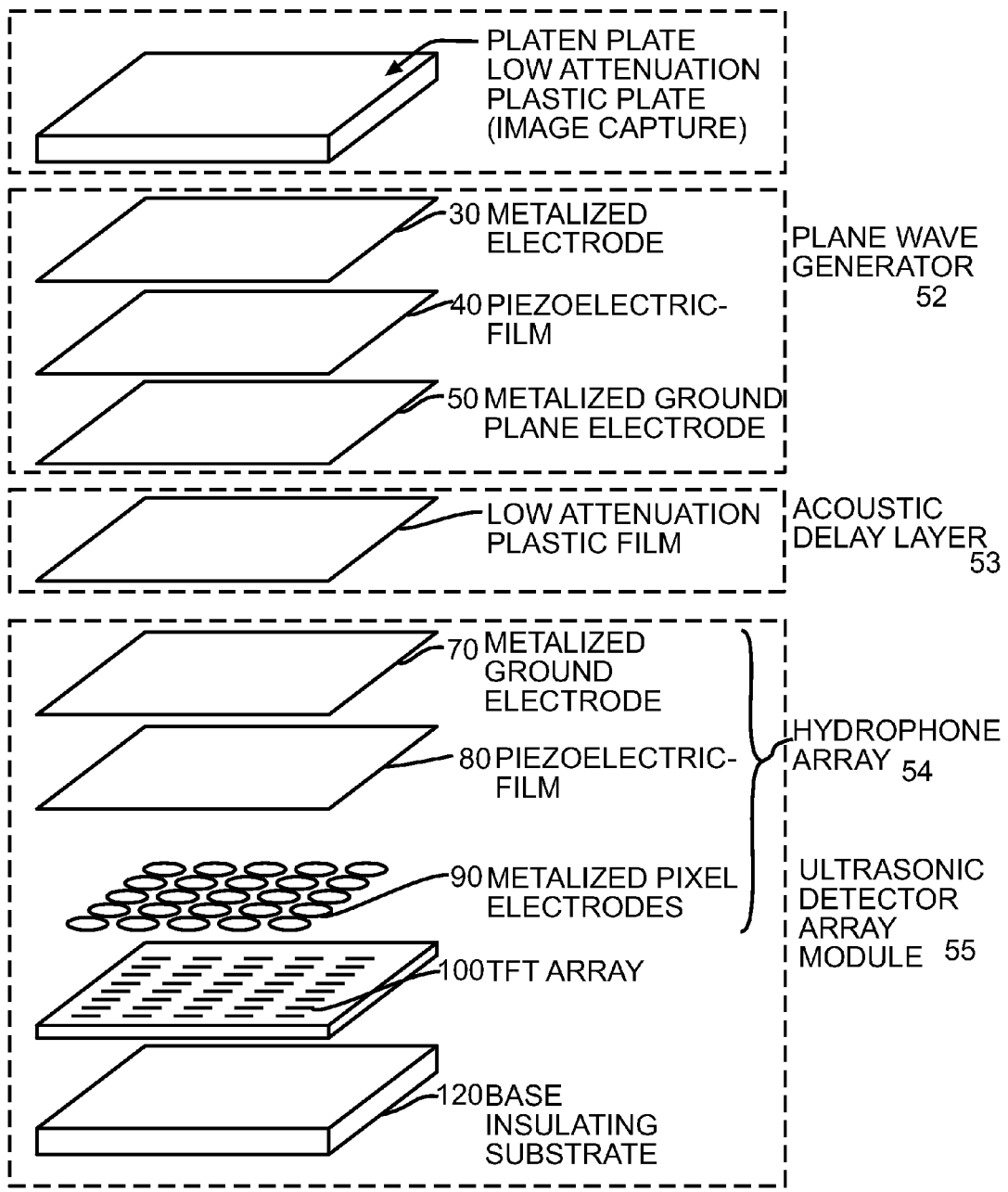
FIG. 2 is an exploded perspective view of the embodiment depicted in FIG. 1.

Shown in FIGS. 1 and 2 is a diagram of a system that is in keeping with the invention. In FIGS. 1 and 2 there is shown an ultrasonic reflex imaging system 20 that is configured as a fingerprint scanner. This embodiment of the invention combines an acoustic detector array module 55, an acoustic delay layer 53, a plane wave generator 52 and a platen 51. The delay layer 53, which may be a low attenuation plastic film, is shown positioned between the plane wave generator 52 and the detector array module 55. The platen 51 accepts the surface of the subject's finger 20, or other biological object.

The acoustic detector array 55 may be constructed with standard thin film transistor (TFT) techniques by applying an array of TFT elements 100 to an insulating substrate 110, then applying an electrode array 90 that is in electrical contact with the inputs of the TFT elements 100. Over the electrode array 90, a piezoelectric film 80 may be applied and a continuous electrode 70 may be over-coated on the piezoelectric film 80. Such an assembly may be used as the ultrasonic detector array 55, and may be sensitive to and produce signals in response to pressure waves impinging on the detector array 55.

The ultrasonic delay layer 53 may be placed on the ultrasonic detector array 55 in order to serve as a means to adjust the ultrasonic pulse timing, and at the same time electrically insulate the ultrasonic detector array 55 from the plane wave generator 52. The delay layer 53 may be substantially uniform across any dimension of the delay layer 53. The material used for the delay layer 53 and/or the thickness of the delay layer 53 may be selected to provide a desired delay in the time needed for the ultrasonic energy reflected from the biological object to reach the detector array 55. In doing so, the range of time during which the valid energy pulse, which carries the desired information about the biological object by virtue of having been reflected by the biological object, may be made to arrive at the detector array 55 during a time range when it is unlikely that energy reflected from other parts of the scanner 10 is arriving at the detector array 55, or at a time range when energy reflected from other parts of the scanner 10 is arriving at the detector array, but that energy is much lower in power than the valid energy pulse.

The generator 52 may include a first metalized electrode 30, a piezoelectric layer 40, and a second metalized electrode 50. The generator 52 may be placed over the delay layer 53. In this manner, the delay layer 53 resides between the generator 52 and the detector array 55. A thin plastic plate may cover the plane wave generator 52 in order to serve as a platen 51. The platen 51 may be sized to receive a finger 20 (or other biological object) and insulate the finger 20 from the electrical energy on the plane wave generator 52. Typical materials of construction for the platen 51 and/or the delay layer 53 are plastics, including polystyrene, polymethylmethacrylate ("PMMA"), and other plastic resins.

In operation, an electrical signal imposes a voltage difference between the electrodes 30, 50 of the generator 52. The voltage difference causes the piezoelectric layer 40 to produce two longitudinal plane waves, which emanate in opposite directions from the piezoelectric layer 40. One of the waves travels toward the platen 51, and the other travels away from the platen 51.

In doing so, one energy wave travels immediately from the generator 52 away from the platen 51 toward the ultrasonic detector array 55. This energy impacts the detector array 55, and signals are sent from the detector array 55 via communication channel 115, but is ignored by the computer 120 since this energy has not been reflected by the biological object, and thus contains no information about the biological object (e.g., a finger 20) that resides on the platen 51.

Figure 3B:
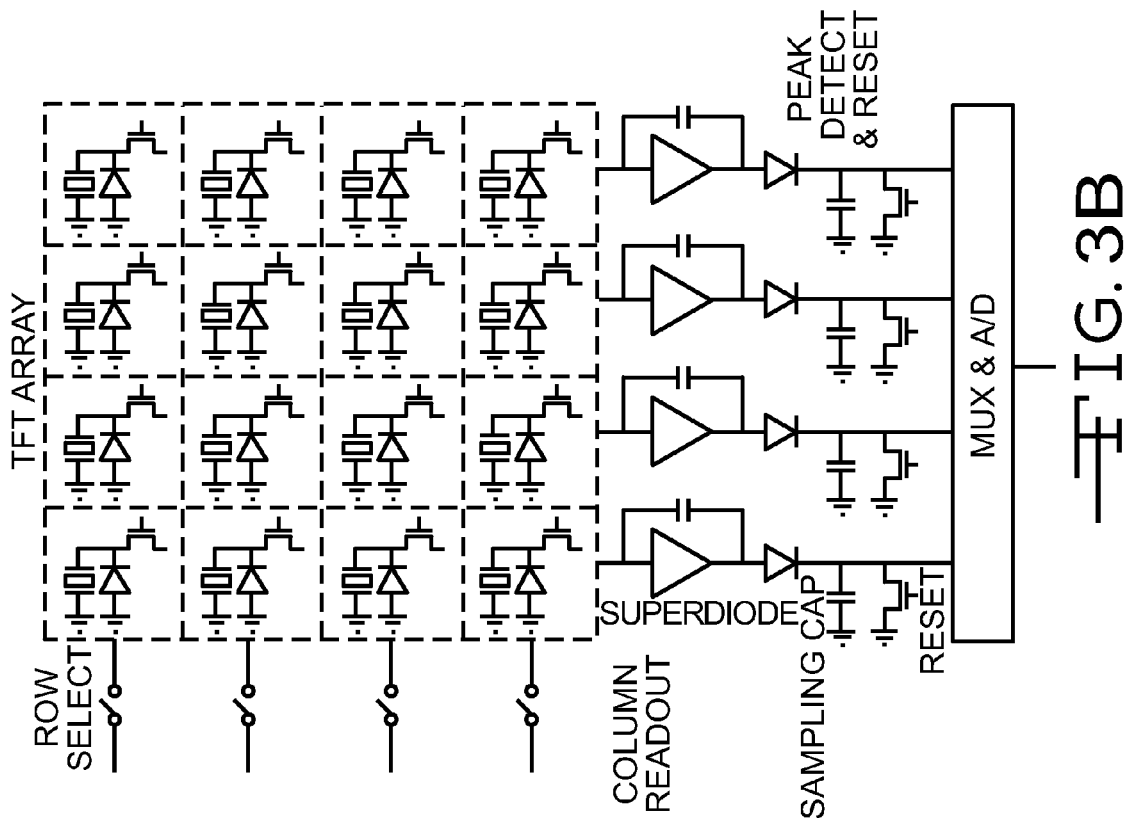
FIGS. 3A and 3B show schematic diagrams of two different TFT array designs that would be suitable for the ultrasonic reflex imaging system of the present invention.
Figure 3A:
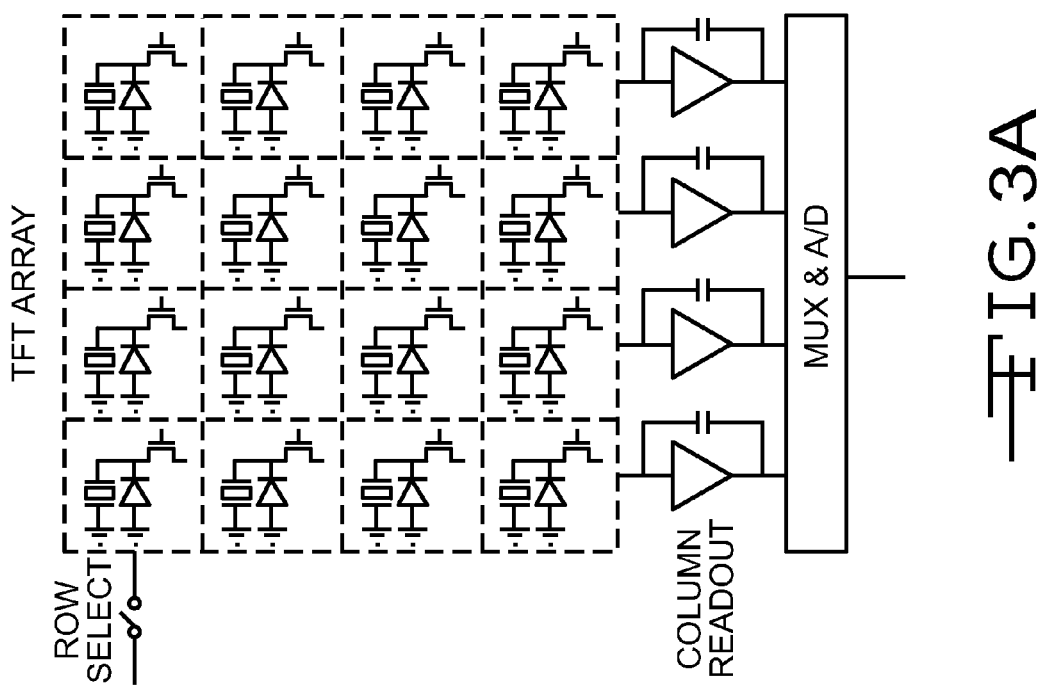

The other energy wave travels immediately from the generator 52 in the other direction, toward the platen 51. If a fingerprint ridge or other coupling material is in contact with the platen 51, then the acoustic energy (e.g. an ultrasonic pulse) reaching that part of the platen 51 passes into the fingerprint ridge, and that energy is either lost or scattered. Energy that reaches a part of the platen 51 at a location where a valley of the fingerprint resides is reflected back toward the acoustic detector array 55. The reflected energy passes though the platen 51, through the generator 52 through the delay layer 53 and toward the detector 55. Upon contacting the detector 55, the reflected energy may be detected by one of the hydrophones of the hydrophone array 54, and converted into electric charge. The electric charge may be read out in a row and column fashion from the array of TFT elements 100 using the control electronics (FIG. 3A or 3B) and computer 120, and then assembled into a grayscale image representation of the fingerprint.

Although energy dispersion of the acoustic signal occurs and would normally detract from obtaining a sharp fingerprint image, if the platen 51, delay layer 53 and other layers of the scanner 10 are kept to a thickness that is within the near field distance, then a fairly true image of the reflex target (such as a finger 20 resting on the platen 51) will result. Should the various components of the system 10 total up to a thickness that is greater than the near field distance, which is a function of the materials properties and the frequencies used, then alternate means may be used for the platen 51 and delay layer 53. These alternate means can be waveguide arrays, microlens arrays, and other similar means designed to reduce attenuation of the longitudinal wave or focus the energy of the longitudinal wave.

It will be apparent to those versed in the art that the combination of (a) a plane wave generator 52, (b) a detector array 55, (c) the delay layer 53, and (d) one or more devices or media that the longitudinal wave energy can travel through, and which transfers information about the biological object (such as a fingerprint) that is in contact with the imaging platen 51 to the detector constitutes a device suitable for producing an image of the biological object that is in contact with the platen 51. As such, the system may be used as a scanner.

The embodiment described herein is a combination of a high resolution ultrasound detector array 55 that works in concert with a physically separate piezoelectric plane wave pulse generator 52 that is capable of emitting a longitudinal wave in the ultrasonic frequency range. The delay layer 53 positioned between the detector array 55 and the generator 52 serves to improve the clarity of the image that can ultimately be generated from the scanner 10, and may be viewed as providing the ability to "tune" a particular system of components to provide a clearer image than was previously possible.

It further teaches that the information that may be obtained about a biological object that is in contact with the platen 51 may be obtained using a computer that receives signals from an array of individually addressable elements 100. The computer 120 may be programmed to interpret the signals received from the addressable elements 100 and produce an image of the biological object. Further, the computer 120 may be programmed to produce a template of the biological image, such as a fingerprint template, which thereby reduces or eliminates the need for further processing of the image information by other systems. Physical separation of the generator and detector allows the ultrasound pulse generation to be optimized without the compromises required of a dual-purpose transducer tasked with both the generating and the detecting obligations. In doing so, intermediate acoustical-optics devices may be used that allow the image to be optimally focused for improved clarity.

Although embodiments of the invention have been described herein, the invention is not limited to such embodiments. For example, although the invention has been described in conjunction with a fingerprint scanner or reader, its use can be applied to other applications which seek to create an acoustic image of an object.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A biometric scanner, comprising:
   a platen;
   an ultrasonic plane wave generator;
   an ultrasonic detector; and
   a low-attenuation-plastic delay layer residing between the generator and the detector.

2. The scanner of claim 1, wherein the ultrasonic detector includes an array of individually addressable elements.

3. The scanner of claim 2, wherein the array of individually addressable elements is a semiconductor array.

4. The scanner of claim 2, wherein the array of individually addressable elements is a TFT array.

5. The scanner of claim 2, wherein the array of individually addressable elements is fixed to an insulating substrate.

6. The scanner of claim 2, wherein the ultrasonic detector includes an insulating substrate.

7. The scanner of claim 6, wherein the insulating substrate is plastic.

8. The scanner of claim 6, wherein the insulating substrate is a ceramic.

9. The scanner of claim 8, wherein the ceramic is glass.

10. The scanner of claim 1, wherein the detector includes a hydrophone array.

11. The scanner of claim 10, wherein the hydrophone array has a first electrode and a plurality of second electrodes, wherein the second electrodes are positioned between the first electrode and the array of individually addressable elements.

12. The scanner of claim 11, wherein the hydrophone array includes a piezoelectric film residing between the first electrode and the plurality of second electrodes.

13. The scanner of claim 12, wherein the piezoelectric film is PVDF.

14. The scanner of claim 12, wherein the piezoelectric film is PVDF-TrFE copolymer.

15. The scanner of claim 12, wherein the piezoelectric film is PVDF-TFE copolymer.

16. The scanner of claim 12, wherein the piezoelectric film is a polymeric or ceramic film exhibiting ferroelectric or piezoelectric properties.

17. The scanner of claim 1, further comprising control electronics connected to the generator and to the detector, the control electronics being able to manage timing of a generated energy pulse, and sensing of reflected energy resulting from the generated pulse, the reflected energy being reflected by an object residing on the platen.

18. The scanner of claim 1, wherein at least one of the platen and the delay layer is a polystyrene resin.

19. The scanner of claim 18, wherein the polystyrene resin is Cross Linked Polystyrene ("XLPS").

20. The scanner of claim 18, wherein the polystyrene resin is General Purpose Polystyrene ("GPPS").

21. The scanner of claim 1, wherein at least one of the platen and delay layer is a PMMA resin.

22. The scanner of claim 1, wherein the delay layer is a plastic material.

23. The scanner of claim 1, wherein the detector is an array of semiconductors.

24. The scanner of claim 23, wherein the semiconductors are CMOS transistors.

25. The scanner of claim 23, wherein the semiconductors are charge coupled devices.

* * * * *